Sept. 27, 1932.  L. W. CHASE ET AL  1,879,733
CULTIVATOR
Filed Nov. 17, 1930   5 Sheets-Sheet 1

Inventors
L. W. Chase
F. L. Zybach
J. C. Brand
By Emil F. Lange
Attorney

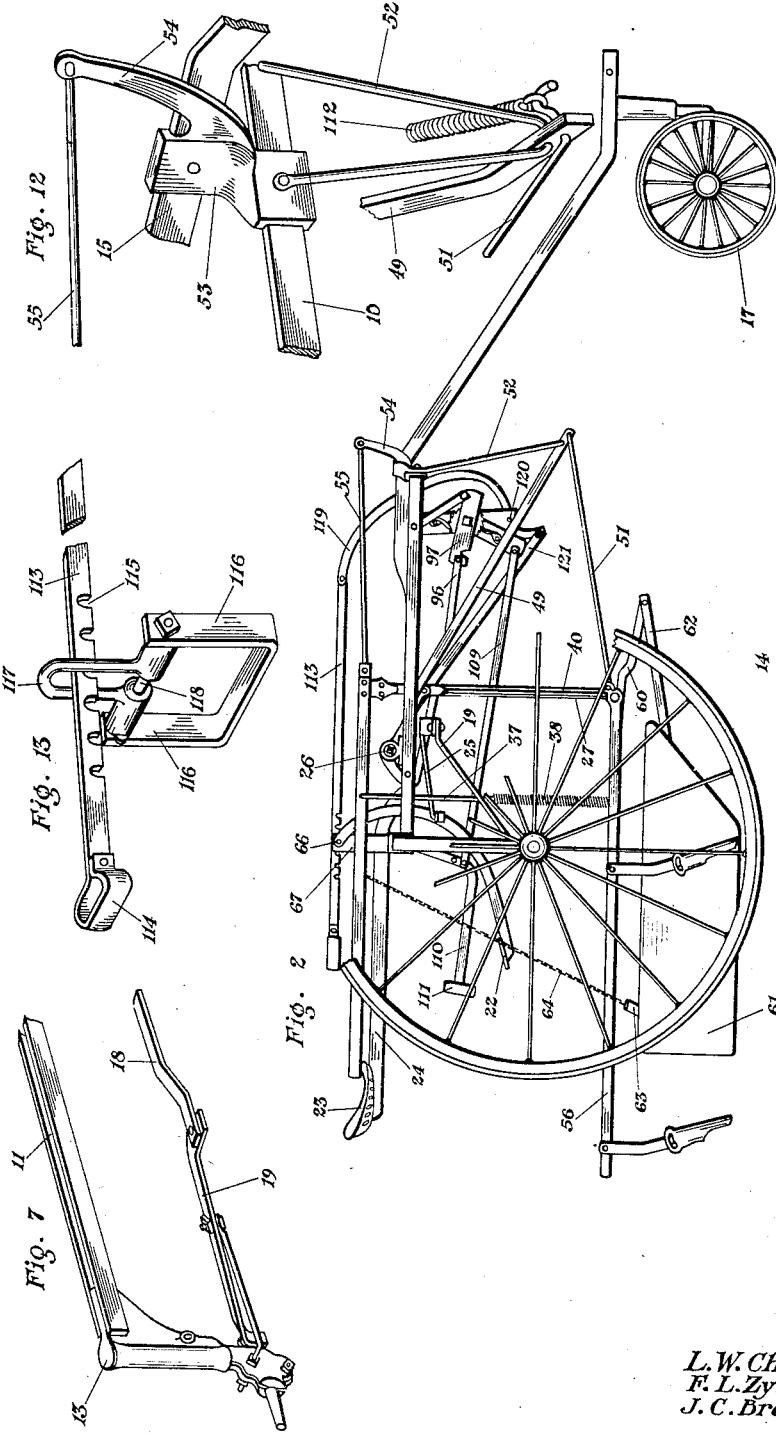

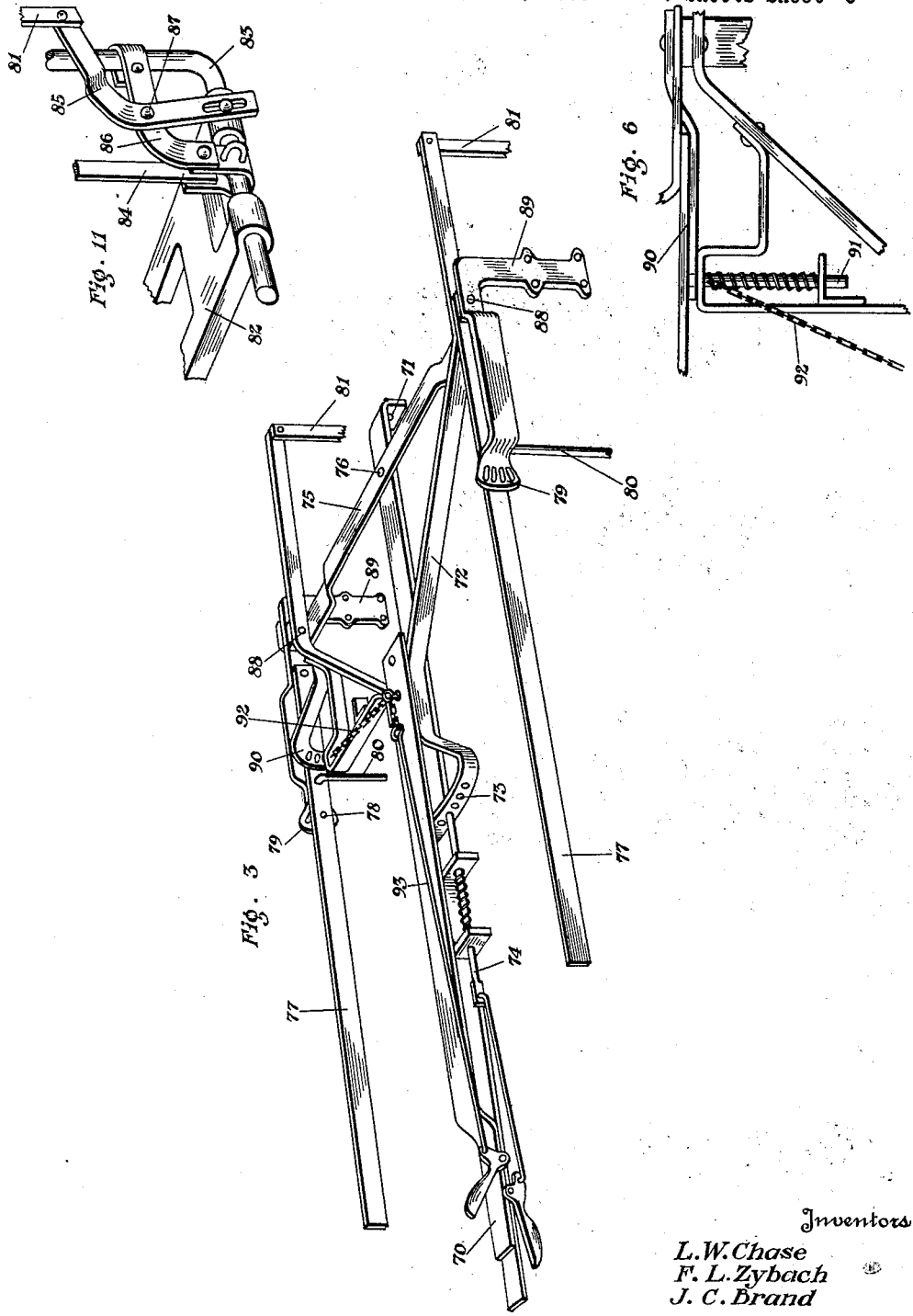

Sept. 27, 1932.  L. W. CHASE ET AL  1,879,733
CULTIVATOR
Filed Nov. 17, 1930  5 Sheets-Sheet 4

Inventors
L. W. Chase
F. L. Zybach
J. C. Brand
By Emil F. Lange
Attorney

Sept. 27, 1932.  L. W. CHASE ET AL  1,879,733
CULTIVATOR
Filed Nov. 17, 1930   5 Sheets-Sheet 5
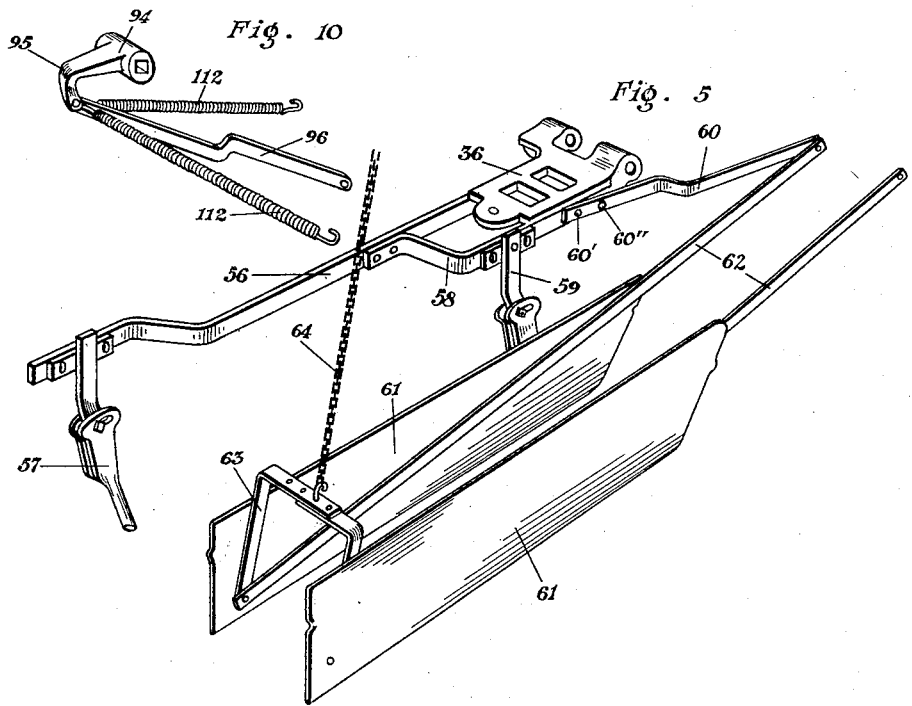
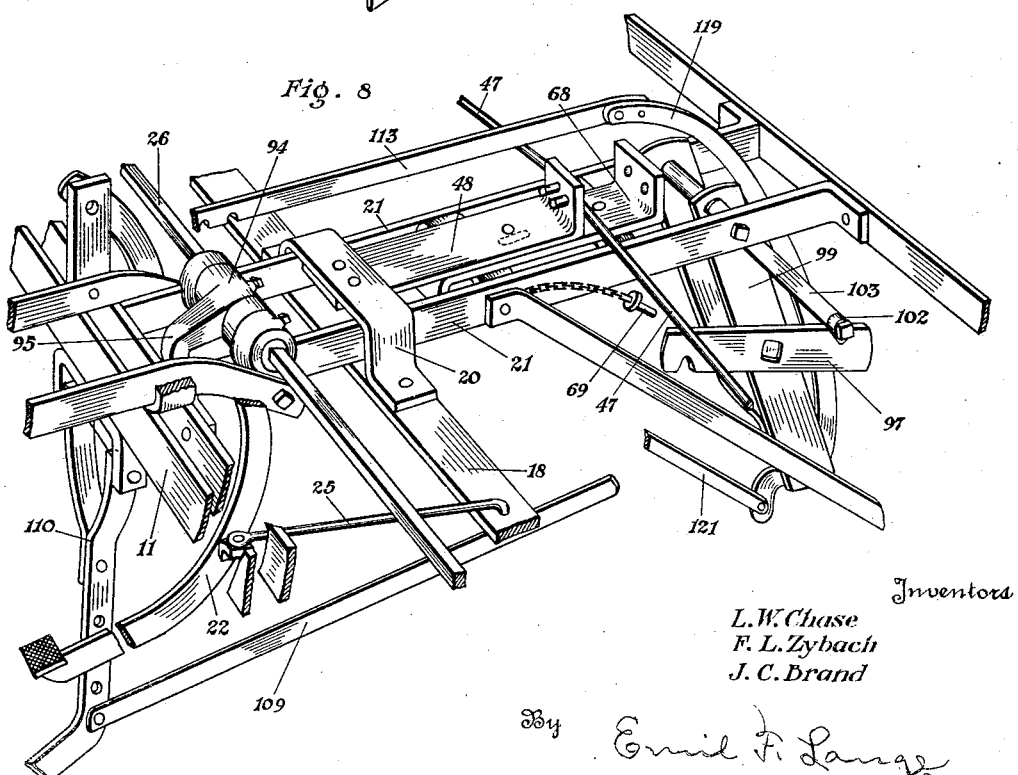
Inventors
L. W. Chase
F. L. Zybach
J. C. Brand
By Emil F. Lange
Attorney Patented Sept. 27, 1932

1,879,733

UNITED STATES PATENT OFFICE

LEON W. CHASE, FRANK L. ZYBACH, AND JAMES C. BRAND, OF LINCOLN, NEBRASKA, ASSIGNORS TO CHASE PLOW COMPANY, OF LINCOLN, NEBRASKA, A CORPORATION OF NEBRASKA

CULTIVATOR

Application filed November 17, 1930. Serial No. 496,216.

The present invention relates to cultivators and more particularly to the multiple row type of straddle row cultivators for cultivating tall growing row crops like corn.

One of the objects of the invention is the provision of a novel form of lifting mechanism for simultaneously raising and lowering all of the cultivating tools and for automatically and releasably latching the cultivating tools in either elevated or depressed position.

Another of the objects is the provision of a novel form of raising and lowering device combined with a novel form of depth regulating mechanism so that the cultivating tools in their lowermost position will operate at the depth determined by the adjustment of the depth regulating mechanism.

Another of the objects is the provision of a tool support of novel form for carrying the earth working tools.

Another object of the invention is the provision of a plurality of tools assembled in a suspended or floating gang which is so hung as to be capable of almost universal movement for various adjustments.

Another object of the invention is the provision of manually operable levers within convenient reach of the driver whereby a single set of tools may be manipulated in an up and down direction to clear the tools of trash.

Another object is the provision of a novel form of fender support which is adapted to automatically move into the most favorable position for protecting the plants in the row whenever the cultivating tools are being cleared of trash.

Another object is the provision of a hand operated lever and cooperating mechanism for shifting the gangs of cultivating tools laterally in either direction to conform to irregularities in the rows, the lever being positioned within convenient reach of the driver.

Still another object is the provision of a hand operated lever with cooperating mechanism for either shifting the gang laterally in either direction or for causing the two cultivating members to move toward or away from each other.

Having in view these objects and others which will be pointed out in the following description, we will now refer to the drawings, in which Figure 1 is a plan view of the implement frame.

Figure 2 is a view in side elevation of the implement frame and of the cultivating tools, showing also in side view the raising and lowering mechanism.

Figure 3 is a view in perspective showing the hand operated lever mechanism for shifting the cultivator tools sidewise to conform to irregularities in the rows of corn or to move the cultivating mechanism toward and away from the rows or to shift the cultivating tools up and down for clearing them of trash.

Figure 5 is a view in perspective of the fender and of the fender support and showing also the relation of the fender to a cultivating unit.

Figure 6 is a plan view of the latch shown in Figure 3.

Figure 7 is a perspective view of a fragment of the frame showing the axle for one of the supporting wheels and showing the parts adjacent to that axle.

Figure 8 is a view in perspective showing a portion of the mechanism for simultaneously raising, lowering, and regulating the depth of the cultivator gang.

Figure 10 is a perspective view showing the detail of the counterbalancing springs used in connection with the cultivator gang raising and lowering mechanism.

Figure 11 is a perspective view showing a portion of the connections between the cultivator gang and the mechanism for raising, lowering or shifting the cultivator gangs in a sidewise direction.

Figure 12 is a perspective view of a fragment of the cultivator frame.

Figure 13 is a view in perspective showing the hand operated lever for adjustably and simultaneously regulating the depth of all of the gangs of the cultivating tools.

Figure 1:
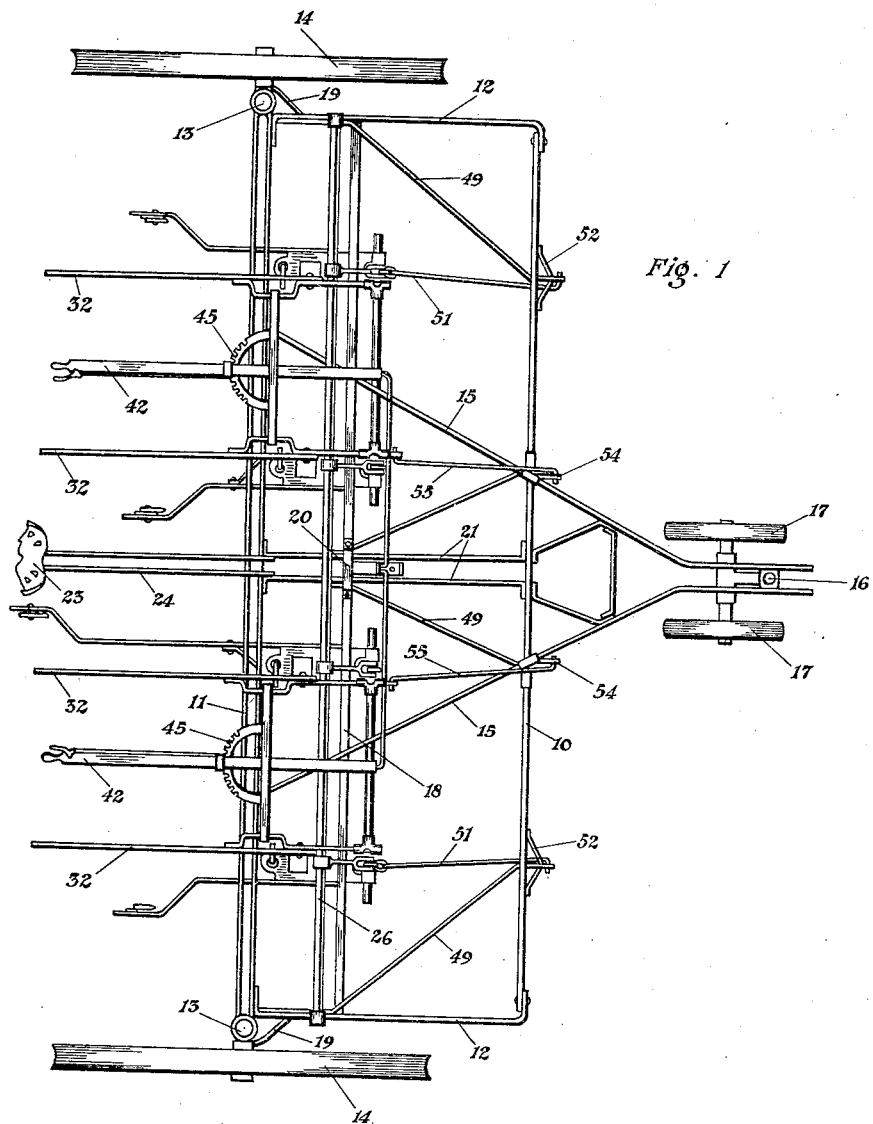

The cultivator frame shown in Figure 1 is substantially rectangular, having a front beam 10, a double rear beam 11 and two side beams 12. The frame is provided at its rear corners with vertical spindles 13 having horizontal axles for supporting the wheels 14, the wheels 14 being both steering and supporting wheels. The frame furthermore includes two inclined beams 15 secured to both the front beam 10 and the rear beam 11 and inclined so as to converge in a forward direction. The forward end portions of the beams 15 are parallel as shown in Figure 1 for supporting a casting 16 which in turn supports a pair of castor wheels 17. The frame may be further braced in any suitable manner as partially shown in Figure 1.

Extending transversely of the implement frame is a steering member 18 which is connected by means of the straps 19 to the vertical spindles 13 in a manner such as to swing the two supporting wheels 14 through unequal arcs. The steering member 18 has a yoke 20 which straddles the two frame members 21 connecting the front and rear beams of the implement frame. The length of the yoke 20 is considerably greater than the distance between the two beams 21 so as to afford considerable play for the steering member 18 in a lateral direction. Pivotally secured to the frame are two foot levers 22 within convenient reach of the driver in his position on the seat 23. The seat support 24 is in the form of two parallel beams, the foot levers 22 being positioned for convenient actuation by the driver. Each foot lever is connected by means of a rod 25 with the steering member 18. The depression of either foot lever will thus cause the steering member 18 to be moved in the direction of the foot lever which is actuated in a downward direction. This movement is communicated through the connections 19 to the supporting wheels 14 which will be caused to swing around in accordance with the movement given to them by the actuation of the foot levers 22.

Extending transversely of the implement is a square rod 26 having its ends journalled in castings projecting upwardly from the side frame members 12. The rod 26 is one of the supporting elements for the cultivating gangs. Each gang includes an arch 27 having out-turned end portions 28. At the upper corners of the arch 27, castings 29 connect the arch to horizontal members 30. These horizontal members 30 extend in a forward and rearward direction and they terminate in a flattened portion 31 having a plurality of apertures in arcuate relation. Secured to each supporting member 30 is a hand lever 32 having a pivot at 33 and having a spring 34 which permits limited movement of the lever 32 away from the flattened portion 31. The levers 32 are provided with pins 35 which are adapted to engage in the apertures of the flattened portion 31. The up and down movement of the lever 32 will thus raise or lower the individual cultivating unit. It serves not only as an adjustment to regulate the depth at which the cultivating unit is to be used and to change the angle of the shovels but its primary purpose is to make it possible to raise and lower the unit during the operation of the cultivator in order to clear the unit of trash which it is apt to collect on the shovels and beams. The cultivating unit is pivotally secured to an out-turned arm 28 of the arch support 27 by means of a casting 36 to which the cultivating unit is adapted to be secured. The connection between the lever 32 and the cultivating unit is made through a link 37 which connects the lever 32 with the casting 36. The link 37 is surrounded by a coil spring 38 having its lower end anchored against the upper surface of the casting 36 and having its upper end bearing against a cotter pin 39. The cultivating unit is further supported by means of a link 40 connecting the out-turned end 28 of the arch 27 with the lever 41 projecting forwardly from the rod 26. The lever 41 is provided with a fork at its forward end, the fork having a pin for pivotally connecting the link 40 thereto.

Figure 4:
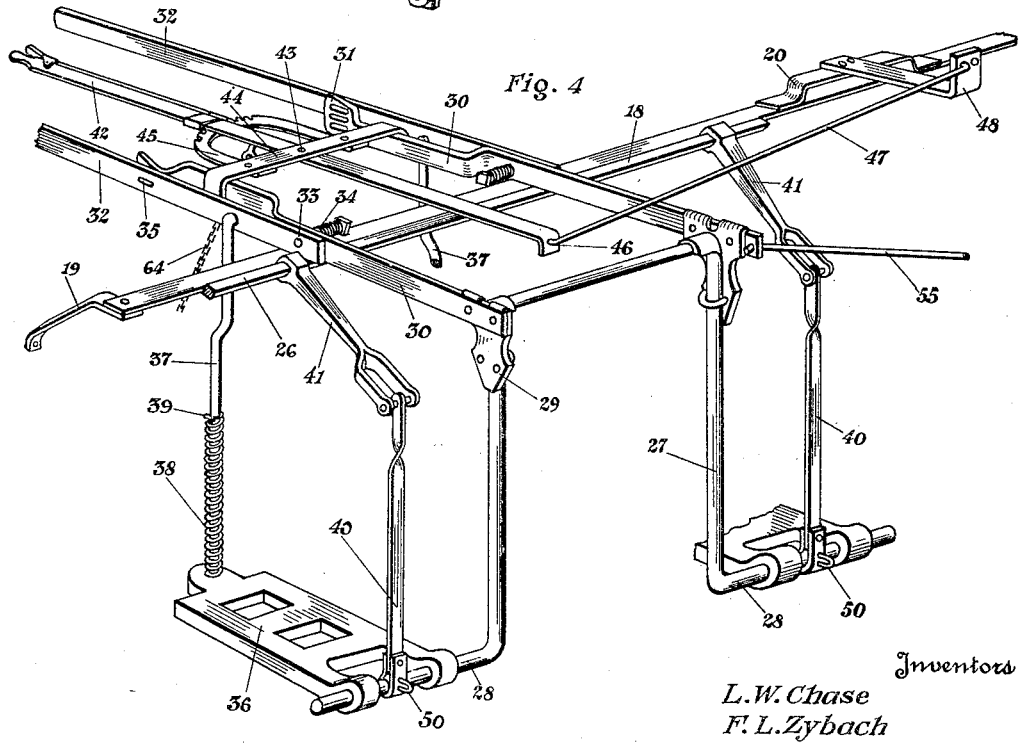
Figure 4 is a perspective view showing the modification of the structure shown in Figure 3.

The entire weight of the cultivating unit is supported through the link 40 and the arm 41 on the square shaft 26. The connections are flexible so as to provide ample adjustment in all directions. The single cultivating tool may be raised or lowered at its rear end by first unlatching one of the two levers 32 and moving it up and down to clear it of trash or to adjust it up or down into latched position for irregularities in the contour of the surface of the soil or to change the angle of the shovels. Corn rows are more or less irregular so that the rows are not always parallel, this being due not only to faulty planting but more particularly to the effects of rains which wash the soil. It is therefore desirable to provide a lateral adjustment which may be manipulated from the driver's position on his seat so as to avoid covering or cutting the corn which is slightly out of alignment in the row. For this purpose a lever 42 is pivotally secured at 43 to a transverse member 44 of the frame of the cultivating unit. This lever 42 is movable in a horizontal direction and it is provided with a latch which cooperates with the arcuate rack 45. The rear end of the lever 42 is connected at 46 with a link 47 which has its inner end secured in a strap 48 on the yoke 20 as shown in Figure 4. During the normal travel of the implement the strap 48 is in fixed position relative to the implement and in consequence the pivotal point 46 is also fixed relative to the implement. The point 46 is therefore the fulcrum of the lever 42 which thus acts upon the frame of the cultivator unit to shift it sidewise, the pivotal connections of the links 40 being sufficiently loose to permit considerable sidewise play. Where the rows of corn are straight for considerable distances, the levers 42 are latched in position and they require no manipulation until the two corn rows depart from their parallel relation. It is to be understood that the arch 27 straddles the corn row and that the two tools or two sets of tools on the supports 36 work the soil on the opposite sides of the corn row.

The implement frame as a whole and the frame of the cultivating unit are provided with braces and links which securely hold the parts in their proper relationship but which permit the adjustments above described. Referring to Figure 1, beams 49 are provided which extend forwardly and downwardly with their rear end portions firmly secured to the implement frame. It will also be noticed in Figure 4 that eyes 50 are provided at the bottom of the links 40. The straps 49 are provided with similar eyes at their forward ends for receiving links 51 having free universal movement in the eyes. These links 51 are in effect drawbars. The forward ends of the straps 49 are slightly forward of the front frame beam 10 from which they are suspended and to which they are rigidly secured as shown at 52 in Figure 1. The castings 53, of which two are employed, are secured to the front beam 10 and to the diagonal braces 15 at their junctions as best shown in Figure 12. The castings 53 are each provided with upwardly and forwardly curved arms 54 for receiving the forward extremities of links 55, these links being secured at their rear extremities to the frames of the cultivating unit in the manner shown in Figure 4. These links also serve as upper drawbars and guiding members for the cultivating units.

The structure of the fenders and their relation to the organization will now be described. As shown in Figure 5, the cultivator includes an outside beam 56 secured to the casting 36, the beam 56 carrying a rear shovel support 57. Secured to the beam 56 and to the inner side of the casting 36 is an L-shaped support 58 to which the forward shovel support 59 is bolted. The shovel supports 57 and 59 are of the usual construction. The arm 60 is firmly secured at its rear end at 60' to the casting 36 and to the L-shaped strap 58 and it has an adjustable connection at 60''. The fender member 61 has secured thereto an arm 62 which is pivotally connected at its forward end to the arm 60. The fender members are in pairs as shown in Figure 5 in which all parts are duplicated including a strap similar to the strap 60, so that the second arm 62 will have an individual pivotal support. The adjustable yoke 63 connects the two fender members at their rear bottom corners. The yoke 63 is adjustable for increasing or decreasing the distance between the two fender members 61 at their rear ends. The yoke is pivotally connected with the two fender members 61 so that each fender member will have individual pivotal movement about its pivotal connection with the yoke 63. A chain 64 connects the yoke 63 with the lever 42. It will thus be seen that a lateral movement of the lever 42 in either direction will be communicated through the chain to the fender so that it maintains its midway position between the two sets of cultivating tools of the gang. By far its more important function relates to the manipulation of the cultivating tools for clearing the tools of trash. As before described, any of the levers 32 may be moved up and down for loosening the trash which tends to accumulate on the cultivating shovels and beams. Such trash is dislodged by the manipulation of these levers but the trash is very apt to fall onto the standing corn with resultant injury to the corn especially when the corn is young. The raising and lowering of the cultivating tools takes place about the pivotal axes of the casting 36 so that when the rear ends of the beams 56 are raised, the forward ends of the supports 60 are lowered. It will readily be apparent that when the forward end of the support 60 is lowered, the strap 62 as well as the forward end of the corresponding fender member 61 must also be lowered. The downward movement of the fender combined with the upward movement of the shovel sweeps from the shovel foreign matter which is thus prevented from rolling onto the plants.

The implement is steered by means of a pair of foot levers 22, one of the foot levers 22 shifting the gang in one direction and the other foot lever shifting it in the opposite direction. The foot levers 22 are pivotally secured at 66 to upturned brackets 67 on the implement frame. These foot levers are secured through links 25 which are pivotally secured both to the foot lever and to the steering bar 18. The actuation of a foot lever 22 will therefore be communicated through the link 25 to shift the steering rod 18 in a lateral direction. This movement will be communicated through the links 47 to the cultivating units and through the extensions 19 to the supporting wheels 14. In the forward travel of the implement over long rows of corn in the field or over stretches of road when the shifting of the gangs is unnecessary, it is desirable that the steering mechanism be locked. This is accomplished with the mechanism shown in Figure 8. The L-shaped strap 48 is secured to the yoke 20 and it is movable in a lateral direction with the lateral movement of the steering bar 18. This strap 48 lies over a similar L-shaped strap 68 and the two L-shaped straps are provided with aligning apertures for the reception of a pin 69. When the two L-shaped straps 48 and 68 have their apertures in registration the implement is adapted to travel in a straight forward direction and it cannot be steered through the supporting wheels 14. The cultivating units likewise remain in fixed position relative to the implement frame. When the pin 69 is in place in the apertures of the straps 48 and 68, the implement frame may be steered only through the front castor wheels by guiding the horses.

In Figures 3, 6 and 11, a modified form of gang controlling means is shown. This includes a lever 70 which is similar to the lever 42 of Figure 4. The front extremity of the lever 70 has an aperture 71 for connection with the link 47 of Figure 4. The strap member 72 which is part of the frame is looped at its rear end to form an apertured arcuate rack 73. The spring pressed hand operated pawl 74 engages this rack 73 in the manner shown in Figure 3. By releasing the pawl 74 from the aperture in the rack 73 the entire gang of cultivating tools may be shifted laterally in either direction and latched in adjusted position. This movement is precisely like that resulting from the lever 42 in Figure 4. The structures, moreover, resemble each other in that a transverse strap 75 is provided with a pivotal connection 76 with the lever 70 similar to the pivotal connection 43 of Figure 4. The two levers 77 are similar in their action to the two levers 32 of Figure 4. These levers cooperate through pins 78 with latches 79. The suspension rods 80 are similar to the suspension rods 37 for yieldably holding the cultivating tools at the desired depth. The lever 77 may be manipulated for agitating the cultivating tools either singly or together for the purpose of clearing the tools of trash. It should be noted that the same fender construction is used as previously described but this is not shown separately as it would obscure other structure. The movement of the fenders, however, is the same as in the Figure 4 construction, the structure on which that movement depends being best shown in Figure 5.

In the Figure 3 construction an additional movement is brought about. At the forward ends are two links 81 which are secured to the tool supports in the manner shown in Figure 11. These tool supports are in the form of castings 82 which are similar to the castings 36 of Figure 4. The arch 83 is identical with the arch 27 of Figure 4 and the suspension arm 84 is identical with the suspension arm 40. The links 81 are connected through curved links 85 in the manner shown in Figure 11. A curved strap 86 extends from the arm of the arch across the angle, it being rigidly secured to both parts of the arch. The curved link is pivotally connected at 87 to the strap 86 and it is slidably connected to a sleeve of the casting 82 by means of a pin and slot connection. The tool frame is pivotally connected through aligning pivots 88 to upstanding brackets 89 which correspond to the brackets 29 of Figure 4. The up and down movement of the frame about the pivots 88 will therefore depress and elevate the links 81. The movements of the links 81 will then be communicated to the curved links 85 to force the two sets of cultivating tools toward and away from each other. The mechanism is normally latched against such movement by means of the rack 90 having a plurality of apertures for the reception of the spring pressed pin 91 as shown in Figure 6. The chain or other flexible member 92 is trained through an eye and connected with a link 93 which is manually operable. Whenever the conditions of the soil make it desirable for the two sets of cultivating tools to work closer together or farther apart it is only necessary to apply tension to the link 93 for releasing the latch 90 and then to elevate or depress the rear end of the lever 70 the required distance.

Figure 9:
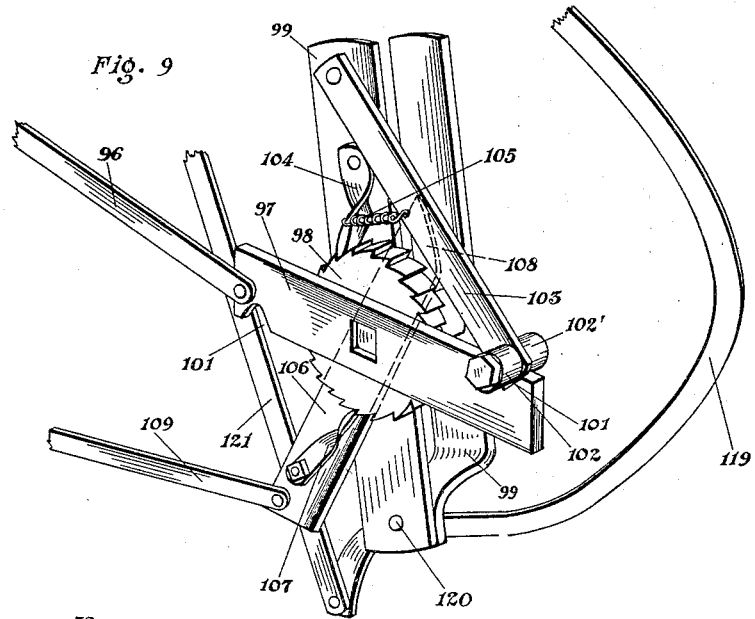
Figure 9 is a perspective view of the ratchet device employed in simultaneously raising and lowering all of the cultivator gangs.

As before stated, the square shaft 26 supports all of the cultivator gangs. Referring now to Figure 8, the square shaft 26 has secured thereto a collar 94 having an arm 95 projecting therefrom, these parts being shown also in Figure 10. The link 96 is pivotally secured to the arm 95 to project forwardly therefrom. At its forward extremity the link 96 is pivotally secured to the extremity of a latching bar 97 which is firmly connected to rotate with a ratchet 98 as shown in Figure 9. The ratchet 98 is journalled on the support 99 which consists of two members connected together in parallel relation as shown in Figure 9. The two parts of the support 99 are connected at their upper extremities to the two transverse frame members 21 of the implement frame, the support having a slight rocking movement about the connection with the frame members 21. The latching bar is provided with two notches 101 at diagonally opposite points for the reception of a latching roller 102 on the lever 103 which is pivotally connected to the supporting member 99. The support 99 also has a pivoted pawl 104 engaging the ratchet 98, the pawl 104 being connected to the lever 103 through a spring 105. The pawl is a holding pawl to prevent reverse movement of the ratchet 98. The lever 106 is adjacent to the ratchet 98 and it has its pivot on the axis of the ratchet but its movement is independent of that of the ratchet. The lever 106 carries an actuating pawl 107. It will readily be apparent from an inspection of Figure 9 that the rocking movement of the lever 106 about its axis will cause the ratchet 98 to turn, it being then held in any position by means of the holding pawl 104. The movement of the ratchet on its axis must, however, be preceded by ejecting the roller 102 from the notch 101. The rocking lever 106 is therefore provided with a beveled end portion 108 for engaging the roller 102' and thus lifting the roller 102 out of the notch. The actuating mechanism for the lever 106 includes a link 109 secured at its rear extremity to a curved lever 110 as shown in Figure 2, the lever 110 being connected at its upper end to the beams 11 of the implement frame as shown in Figure 8. The lever 110 terminates in a looped foot engaging member 111 which is positioned conveniently for the driver on the seat 23, the parts being so arranged that the driver may either raise or lower the rear end of the lever 110. The raising of the pedal 111 causes the rearward movement of the link 109 while the lowering of the pedal 111 results in the forward movement of the link 109. By actuating the foot pedal 111 back and forth the pawl 107 may alternately slide over the teeth of the ratchet 98 and turn the ratchet on its axis on the downward movement of the pedal 111.

The latching link 97 is connected through the link 96 with the square shaft 26, the connection being through the arm 95 as shown in Figures 8 and 10. It will be apparent that the movement through a half revolution of the ratchet 98 will result in an axial movement of the square shaft 26 to either raise or lower all the cultivator gangs. This movement is facilitated by the counterbalancing springs 112 which are under tension when the gangs are in their lowermost position. When the gangs are in their uppermost position they are so high above the crop and also above any elevation in the road that they will clear such elevations. When the gangs are in their lowermost position they are in the operating position for cultivation.

Associated with the raising and lowering mechanism as above described is a depth regulating mechanism for determining the depth at which the shovels sink into the soil. This mechanism includes a lever 113 having a hand grip 114 immediately forward of the driver's position on the seat 23. This lever 113 is arranged for horizontal forward and rearward movement and it is provided with a plurality of notches 115 as shown in Figure 13. The pair of upstanding arms 116 are secured to the double seat bar 24, they being in U-form. The yoke 117 is secured to the arms 116 to prevent lateral movement of the lever 113. The pivot pin 118 connecting the yoke 117 to the arms 116 is adapted to seat in a notch 115 of the lever 113 for latching the lever 113 in adjusted position. At its forward extremity the lever 113 is secured to a curved lever 119 having the form as shown in Figure 2. The curved lever 119 is pivotally connected at 120 to the lower end portion of the support 99. The lower end of the lever 119 is connected with a brace 121 extending upwardly and rearwardly and is secured to the frame in a manner such as to have slight rocking movement relative to the frame. Since the lower end of the lever 119 is substantially in fixed position because of the brace 121, the movement of the lever 113 results in an arcuate movement of the pivot axis 120. Since the supports 99 are secured for rocking movement relative to the implement frame, the arcuate movement of the pivot axis 120 will take place about the upper extremity of the support 99. This will move the ratchet 98 back or forth which carries with it the latching bar 97. The link 96 will follow this movement, and since the link 96 is connected with the arm 95 of the collar 94 for encircling the square shaft 26, the actuation of the lever 113 will result in a limited rocking movement of the square shaft 26 to raise or lower the cultivator gangs.

The cultivator beams are pivotally movable within the tool frames and they are bodily movable with the tool frames. The pivotal movement within the tool frames takes place about the pivotal connections of the individual beams with the laterally projecting arms 28 of the arch 27, this movement being controlled through the hand levers 32. The bodily movement of the tool frames which carries with it all of the cultivator beams is controlled through the rocking of the square shaft 26 in either of two ways. The movement of the lever 113 results in a very slight rocking of the square shaft 26 strictly for adjusting purposes to control the depth at which the cultivating tools work. The other bodily movement of all of the gang frames results from the actuation of the foot lever 110 as above described. This movement of the foot lever 110 elevates all of the tool frames into inoperative position or permits them to drop against the action of the counterbalancing springs 112 into operative position. The tool frames are suspended from the free ends of the arms 41 projecting from the rock shaft 26, the links 40 connecting the free ends of the arms 41 to the tool frames at points on the laterally projecting arms 28 of the arch 27. By means of the links 51 and 55 the tool frames are maintained in horizontal position during the elevation and lowering of the tool frames as well as during the operation of the cultivator. The links 51 and 55 preserve the parallel movement of the parts during raising and lowering so that the tool frames will always be in horizontal position.

Having thus described our invention in such full, clear, and exact terms that its construction and operation will be readily understood by others skilled in the art to which it pertains, what we claim as new and desire to secure by Letters Patent of the United States is:

1. In a cultivator, an implement frame having a rock shaft, a tool frame suspended from said rock shaft, and means for raising and lowering said tool frame, said means including a ratchet wheel and a link connection between said ratchet wheel and said rock shaft whereby the rotation of said ratchet wheel will cause the rocking of said rock shaft to raise or lower said tool frame, and means for rotating said ratchet wheel.

2. In a cultivator, an implement frame having a rock shaft, a tool frame suspended from said rock shaft, and means for raising and lowering said tool frame, said means including a ratchet wheel and a link connection between said ratchet wheel and said rock shaft whereby the rotation of said ratchet wheel will cause the rocking of said rock shaft to raise or lower said tool frame, means for rotating said ratchet wheel in one direction only, and a holding pawl for preventing reverse rotation of said ratchet wheel.

3. In a cultivator, an implement frame having a rock shaft, a tool frame suspended from said rock shaft, and means for raising and lowering said tool frame, said means including a rotatable ratchet wheel and a link connection between said ratchet wheel and said rock shaft whereby the rotation of said ratchet wheel will cause the rocking of said rock shaft to raise or lower said tool frame, means including a lever and a pawl for rotating said ratchet wheel, and a latch associated with said ratchet wheel for releasably latching said ratchet wheel against rotation.

4. In a cultivator, an implement frame having a rock shaft, a tool frame suspended from said rock shaft, and means for raising and lowering said tool frame, said means including a rotatable ratchet wheel and a link connection between said ratchet wheel and said rock shaft whereby the rotation of said ratchet wheel will cause the rocking of said rock shaft to raise or lower said tool frame, a latch associated with said ratchet wheel for releasably latching said rotatable member against rotation, and means for first releasing said latch and then rotating said ratchet wheel, said means including a lever and a pawl.

5. In a cultivator, an implement frame having a rock shaft, a tool frame suspended from said rock shaft, and means for raising and lowering said tool frame, said means including a rotatable member and a link connection between said rotatable member and said rock shaft whereby the rotation of said rotatable member will cause the rocking of said rock shaft to raise or lower said tool frame, a latch associated with said rotatable member for releasably latching said rotatable member against rotation, means for first releasing said latch and then rotating said rotatable member, and other means for axially moving said rotatable member through a limited arc for limiting the degree of lowering of said tool frame.

6. In a cultivator, an implement frame having a rock shaft, a tool frame suspended from said rock shaft, and means for raising and lowering said tool frame, said means including a ratchet wheel and a link connection between said ratchet wheel and said rock shaft whereby the rotation of said ratchet wheel will cause the rocking of said rock shaft to raise or lower said tool frame, reciprocating means for rotating said ratchet wheel step by step, and an automatic latch for releasably latching said ratchet wheel at each half revolution thereof, said reciprocating means being operable to release said latch.

7. In a cultivator, an implement frame having a transverse shaft, arms secured to said shaft and projecting therefrom, a tool frame suspended from said implement frame through links connecting said tool frame to said arms, a lever fulcrumed on said tool frame and having a link connection with said implement frame for laterally shifting said tool frame, and means for rocking said shaft to raise or lower said tool frame.

8. In a cultivator, an implement frame having a transverse shaft, arms secured to said shaft and projecting therefrom, a tool frame suspended from said implement frame through links connecting said tool frame to said arms, a pair of tool carrying beams carried by said tool frame and adapted to straddle a row, a lever fulcrumed on said tool frame and having a link connection with said implement frame for laterally shifting said tool frame, and means for rocking said shaft to raise or lower said tool frame.

9. In a cultivator, an implement frame having a transverse shaft, arms secured to said shaft and projecting therefrom, a tool frame suspended from said implement frame through links connecting said tool frame to said arms, a pair of tool carrying beams pivotally connected to said tool frame and adapted to straddle a row, a lever fulcrumed on said tool frame and having a link connection with said implement frame for laterally shifting said tool frame, and means for rocking said shaft to raise or lower said tool frame.

10. In a cultivator, an implement frame having a transverse shaft, arms secured to said shaft and projecting therefrom, a tool frame suspended from said implement frame through links connecting said tool frame to said arms, a pair of tool carrying beams pivotally secured at their forward extremities to said tool frame and adapted to straddle a row, means for individually raising or lowering the rear end portions of said beams about their pivotal connections, a lever fulcrumed on said tool frame and having a link connection with said implement frame for laterally shifting said tool frame, and means for rocking said shaft to raise or lower said tool frame.

11. In a cultivator, an implement frame having a transverse shaft, arms secured to said shaft and projecting therefrom, a plurality of tool frames, links connecting said tool frames to said arms, means for rocking said shaft to simultaneously raise or lower all of said tool frames, each of said tool frames having a pair of tool carrying beams for straddling a row, a level fulcrumed on each of said tool frames and having a link connection with said implement frame for laterally shifting each of said tool frames, and means on said tool frames for individually raising or lowering said beams.

12. In a cultivator, an implement frame having a transverse shaft, arms secured to said shaft and projecting therefrom, a plurality of tool frames, links connecting said tool frames to said arms, means for rocking said shaft to simultaneously raise or lower all of said tool frames, each of said tool frames having a pair of tool carrying beams for straddling a row, said beams being pivotally connected at their forward extremities to said tool frames, a lever fulcrumed on each of said tool frames and having a link connection with said implement frame for latterally shifting each of said tool frames, and means on said tool frames for individually raising or lowering said beams about their pivotal connections with said tool frames.

13. In a cultivator, an implement frame having a transverse shaft, arms secured to said shaft and projecting therefrom, a plurality of tool frames, links connecting said tool frames to said arms, means for rocking said shaft to simultaneously raise or lower all of said tool frames, each of said tool frames having a pair of tool carrying beams for straddling a row, means for individually shifting said tool frames sidewise relative to said implement frame comprising a lever fulcrumed on each of said tool frames and having a link connection with said implement frame for laterally shifting each of said tool frames, and means on said tool frames for individually raising or lowering said beams.

14. In a cultivator, an implement frame having a transverse shaft, arms secured to said shaft and projecting therefrom, a tool frame suspended from said implement frame through links connecting said tool frame to said arms, a tool carrying beam pivotally connected to said tool frame, a lever fulcrumed on said tool frame and having a link connection with said implement frame for laterally shifting said tool frame, means for rocking said shaft to adjust the working depth of said tools of said tool carrying beam, and other means for rocking said shaft for lowering or raising said tool frame into operative or inoperative position for said tools of said tool carrying beam.

15. In a cultivator, an implement frame, a tool frame suspended from said implement frame, a pair of tool carrying beams pivotally secured at their forward extremities to said tool frame, means on said tool frame for individually raising or lowering said beams about their pivotal axes, means on said tool frame for shifting said beams sidewise, and means on said implement frame for bodily raising or lowering said tool frame and said beams.

16. In a cultivator, an implement frame, a plurality of tool frames suspended from said implement frame, each of said tool frames having a pair of tool carrying beams adapted to straddle a row, means on said tool frames for individually raising or lowering said beams, means on said tool frames for shifting said tool frames sidewise, means on said tool frames for shifting the beams of a pair of said beams toward or away from each other, and means on said implement frame for bodily raising or lowering all of said tool frames and said beams in unison.

In testimony whereof we affix our signatures.

LEON W. CHASE.
FRANK L. ZYBACH.
JAMES C. BRAND.